United States Patent
Li et al.

(10) Patent No.: US 8,996,401 B2
(45) Date of Patent: Mar. 31, 2015

(54) METHODS AND SYSTEMS FOR TRACKING CUSTOMER RESPONSE TO A COUPON

(75) Inventors: Jun Li, Mountain View, CA (US); Ismail Ari, Hayward, CA (US); Elsa Durante, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1579 days.

(21) Appl. No.: 11/742,353

(22) Filed: Apr. 30, 2007

(65) Prior Publication Data

US 2008/0270231 A1 Oct. 30, 2008

(51) Int. Cl.
G06Q 30/00 (2012.01)

(52) U.S. Cl.
USPC .................. 705/14.35; 705/14.36; 705/14.37

(58) Field of Classification Search
CPC ...................................... G06Q 30/02
USPC ............... 705/1–20, 22, 14.35, 14.36, 14.37; 707/1–10
See application file for complete search history.

(56) References Cited

U.S. PATENT DOCUMENTS

| | | | |
|---|---|---|---|
| 5,502,636 A * | 3/1996 | Clarke | 705/10 |
| 5,822,735 A | 10/1998 | De Lapa et al. | |
| 5,855,007 A * | 12/1998 | Jovicic et al. | 705/14 |
| 5,907,830 A | 5/1999 | Engel et al. | |
| 6,230,143 B1 | 5/2001 | Simons et al. | |
| 6,298,330 B1 | 10/2001 | Gardenswartz et al. | |
| 6,862,575 B1 * | 3/2005 | Anttila et al. | 705/14 |
| 8,473,342 B1 | 6/2013 | Roberts | |
| 2001/0001145 A1 * | 5/2001 | Barnett et al. | 705/14 |
| 2002/0095333 A1 * | 7/2002 | Jokinen et al. | 705/14 |
| 2002/0107738 A1 * | 8/2002 | Beach et al. | 705/14 |
| 2004/0243478 A1 * | 12/2004 | Walker et al. | 705/26 |
| 2005/0222910 A1 * | 10/2005 | Wills | 705/22 |
| 2006/0026070 A1 | 2/2006 | Sun | |
| 2006/0085260 A1 | 4/2006 | Yamagishi | |
| 2006/0149627 A1 | 7/2006 | Brown | |
| 2006/0194569 A1 | 8/2006 | Hsueh | |
| 2006/0195360 A1 | 8/2006 | Watanabe et al. | |
| 2007/0084917 A1 | 4/2007 | Fajkowski | |
| 2007/0087732 A1 | 4/2007 | Hsueh | |

OTHER PUBLICATIONS

Coupons Inc., "Bricks Duet(TM)," (web page), available Feb. 11, 2007, <http://web.archive.org/web/20070211063549/http://solutions.coupons.com/solutions/main/SubTechBricksDuet.asp>.

Coupons Inc., "Bricks," (web page), Feb. 24, 2007, <http://web.archive.org/web/20070224150030/http://solutions.coupons.com/solutions/main/SubTechBricks.asp>.

Coupons Inc., "Coupons, Inc. Business Site," (web page), available Apr. 17, 2004, <http://web.archive.org/web/20040417094904/http://solutions.coupons.com/solutions/main/>.

Coupons Inc., "Coupons, Inc. Wins Court Victory Against Counterfeiters," (web page), Feb 5, 2004, <http://web.archive.org/web/20040410083958/http://solutions.coupons.com/solutions/main/Article27.asp>.

(Continued)

Primary Examiner — Sun Li

(57) ABSTRACT

Methods, systems and computer readable medium storing computer executable programs for tracking customer response to a coupon are disclosed. A coupon is issued. A first determination is made regarding whether the coupon has been selected for viewing by a customer. A first state is assigned to the coupon based on the first determination. A second determination is made regarding whether the coupon has been redeemed by the customer. A second state is assigned to the coupon based on the second determination.

24 Claims, 5 Drawing Sheets

(56) References Cited

OTHER PUBLICATIONS

Coupons Inc., "Dynamic Adbricks(TM)," (web page), Feb. 11, 2007, <http://web.archive.org/web/20070211101457/http://solutions.coupons.com/solutions/main/SubTechAdBricks.asp>.
Coupons Inc., "Ebricks," (web page), available Feb. 10, 2007, <http://web.archive.org/web/20070210111216/http://solutions.coupons.com/soutions/main/SubTechEBricks.asp>.
Coupons Inc., "Home," (web page), available Oct. 19, 2006, <http://web.archive.org/web/20061019011006/http://www.couponsinc.com/corp/index.asp>.
Coupons Inc., "Our Technology," (web page), available Oct. 19, 2006, <http://web.archive.org/web/20061019011230/http://www.couponsinc.com/corp/source/oc_ourtechnology.asp>.
Coupons Inc., "Technology Overview," (web page), available Feb. 19, 2007, <http://web.archive.org/web/20070219060910/http://solutions.coupons.com/solutions/main/SubTechOverview.asp>.

* cited by examiner

METHODS AND SYSTEMS FOR TRACKING CUSTOMER RESPONSE TO A COUPON

FIELD OF THE INVENTION

The present invention generally relates to coupon management and more particularly to methods and systems for tracking customer response to a coupon.

BACKGROUND OF THE INVENTION

Retailers and manufacturers routinely issue coupons to entice prospective customers into purchasing their products. Coupons are often issued to encourage product purchases, promote products, create product awareness, encourage product trials, reward repeat purchases, and clear unwanted inventory of products.

Capturing and analyzing customer coupon usage patterns may provide insight into customer shopping habits. Tracking customer responses to issued coupons is often an effective mechanism for identifying customer specific characteristics. Coupons and promotions can then be tailored to specific customers based on an analysis of identified customer specific characteristics. This may enable retailers and manufacturers to more effectively target their coupon offerings to interested customers and refine future product campaigns and promotions.

SUMMARY OF THE INVENTION

One aspect of the invention is directed to a method of tracking customer response to a coupon. A coupon is issued. A first determination is made regarding whether the coupon has been selected for viewing by a first customer. A first state is assigned to the coupon based on the first determination. A second determination is made regarding whether the coupon has been redeemed by the first customer. A second state is assigned to the coupon based on the second determination.

Another aspect of the invention is directed to a computer readable medium for storing a computer executable program for tracking customer response to a coupon. Yet another aspect of the invention is directed to a system for tracking customer response to a coupon.

DETAILED DESCRIPTION OF THE DRAWINGS

Figure 1:
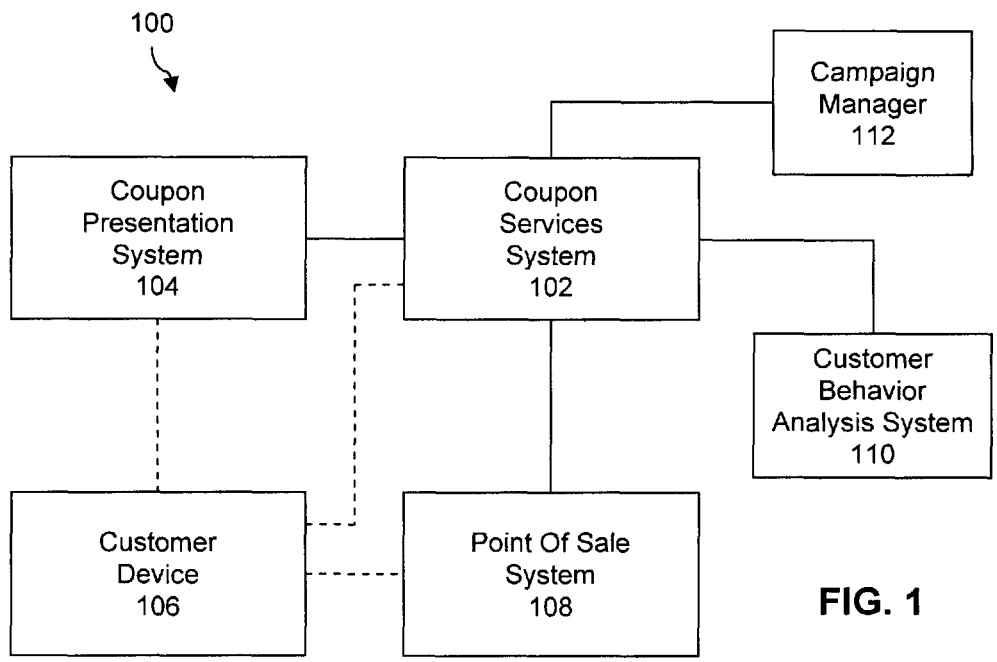
FIG. 1 is a block diagram representation of an example of a system that may be used to implement one embodiment of a system for tracking customer response to a coupon.

Referring to FIG. 1, a block diagram representation of an example of a system 100 that may be used to implement one embodiment of a coupon tracking system is shown. The system 100 generally includes a coupon services system 102 communicatively coupled to a coupon presentation system 104, and one or more point of sale systems 108. The coupon services system 102 is communicatively coupled to a customer behavior analysis system 110 and a campaign manager 112.

The coupon services system 102 generally issues personalized coupons for customers and tracks customer responses to the issued personalized coupons. The coupon services system 102 issues personalized coupons for customers such that a coupon usage policy can be assigned to each uniquely identified coupon. In one embodiment, only the customer issued a specific personalized coupon can redeem that coupon. Other policies such as for example, use, redeeming, or transfer rights of coupon can also be associated with the uniquely identified coupon. The coupon services system 102 tracks customer responses to the issued personalized coupons and assigns a coupon state to each coupon based on the tracked customer response. The assigned coupon states are stored at the coupon services system 102 and analyzed to fine tune the future issuance of specific personalized coupons for individual customers.

The coupon services system 102 issues personalized coupons for a customer based on one or more of a number of different customer specific parameters including, but not limited to, a customer profile, a customer group profile, store locations in close proximity to the customer, store specific promotions, retailer specific promotions, manufacturer specific promotions, and campaign specific promotions. In one embodiment, the customer profile includes a history of customer responses to previously issued personalized coupons for the customer. In one embodiment, the customer profile includes demographic information and other past shopping history information. In one embodiment, the coupon services system 102 retrieves the customer specific parameters from the customer behavior analysis system 110.

In one embodiment, the coupon services system 102 issues each of the personalized coupons with a unique coupon identifier. In one embodiment, the unique coupon identifier is linked to a unique customer identifier to facilitate the tracking of the coupon and customer specific behavior. In one embodiment, each coupon is associated with one or more different types of coupon data including, but not limited to, a unique coupon identifier, a unique customer identifier, a customer group identifier, a product identifier, a store identifier, a promotional campaign identifier, and a coupon issuance timestamp. In one embodiment, one or more of the different types of coupon data are included as a component of the personalized coupon. In one embodiment, the unique coupon identifier is included as a component of the personalized coupon. The other different types of coupon data associated with the personalized coupon are stored at the coupon services system 102. The coupon service system 102 retrieves desired coupon data associated with a specific personalized coupon using the unique coupon identifier.

Figure 2:
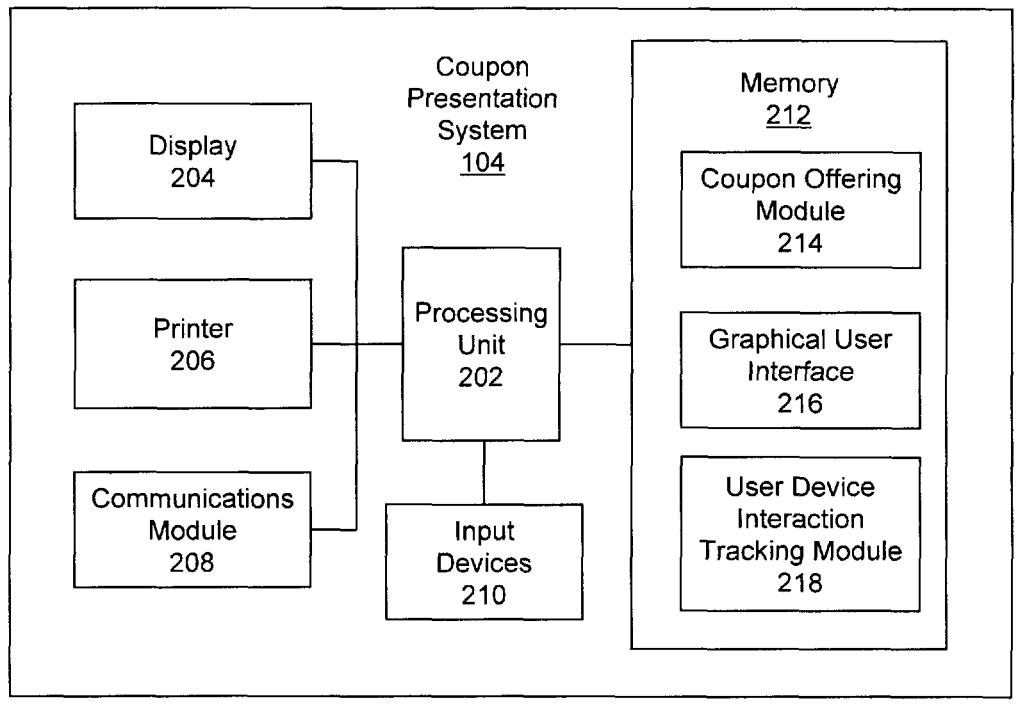
FIG. 2 is a block diagram representation of a coupon presentation system.

Referring to FIG. 2, one embodiment of a coupon presentation system 104 is shown. The coupon presentation system 104 provides a customer with access to the personalized coupons issued specifically for that customer by the coupon services system 102. Examples of coupon presentation systems 104 include, but are not limited to, a point of sale kiosk, an in-store kiosk, a web-based online retailer site, a web-based online manufacturer site, an email system, and an online web-based coupon broker site.

The coupon presentation system 104 generally includes a processing unit 202 communicatively coupled to a display 204, a printer 206, a communications module 208, one or more input devices 210 and a memory 212. A coupon offering module 214, a graphical user interface (GUI) 216, and a user device interaction tracking module 218 are stored in the memory 212. Other modules that facilitate the operation of the coupon presentation system 104 may also be stored in the memory 212.

The processing unit 202 generally includes a processor or controller. Examples of input devices include, but are not limited to, a keyboard, a mouse, a barcode scanner, and a touchscreen display screen. The communication module 208 generally coordinates the exchange of data between the coupon presentation system 104 and the coupon services system 102. In one embodiment, the memory 212 includes one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices. The processing unit 202 generally retrieves and executes machine readable instructions or software programs that are stored in the memory 212.

The coupon offering module 214 generally retrieves personalized coupons for customers from the coupon services system 102. When a customer wishes to access the personalized coupons issued by the coupon services system 102, the customer initiates a coupon access session with the coupon services system 102 via a coupon presentation system 104. The coupon offering module 214 issues a request to the coupons services system 102 for the personalized coupons that have specifically been issued for that customer by the coupon services system 102. The received personalized coupons are maintained by the coupon offering module 214 for the duration of the coupon access session between the customer and the coupon services system 102. Once the coupon access session between the customer and the coupon service system 102 via the coupon presentation system 104 is terminated, the personalized coupons for that customer are no longer maintained by the coupon offering module 214.

The GUI 216 presents the personalized coupons to the customer via the display 204 and displays one or more of the personalized coupons for viewing by the customer responsive to coupon display instructions received from the customer. Examples of coupon display instructions that may be received from a customer to display coupons for viewing by the customer on the display 204 include, but are not limited to, page up or page down instructions, page scrolling instructions, clicking on or touching a specific coupon to get more detailed information on that coupon offer, selecting a category of coupons for display, and requesting the loading of a page of coupons for display. While a number of different types of coupon display instructions have been described, alternative types of coupon display instructions maybe used in alternative embodiments to request the display of selected coupons for viewing by a customer on the display 204.

The GUI 216 provides the customer with the option of printing one or more selected personalized coupons using the printer 206. In one embodiment the GUI 216 provides the customer with the option of digitally saving one or more selected personalized coupons on a customer device 106. Examples of customer devices 106, include, but not limited to, a customer memory device, a customer personal computer, or a customer mobile device.

The user device interaction tracking module 218 generally tracks customer responses provided via the input device 210 at the coupon presentation system 104. More specifically, the user device interaction tracking module 218 tracks coupon display instructions, coupon printing instruction, and coupon saving instructions as they are received from the customer at the coupon presentation system 104.

In one embodiment, the tracked customer responses are forwarded to the coupon services system 102 on a real time basis. The coupon services system 102 receives the tracked customer responses, and updates coupon states of the personalized coupons associated with received customer responses based on the received tracked customer responses. In one embodiment, the coupon services system 102 uses the updated coupon states to generate additional personalized coupons for the customer on a real time basis and forwards the additional personalized coupons to the coupon presentation system 104 for presentation to the customer. In an alternative embodiment, the tracked customer responses are bundled and forwarded to the coupon services system 102 at the conclusion of the customer coupon access session.

Figure 3:
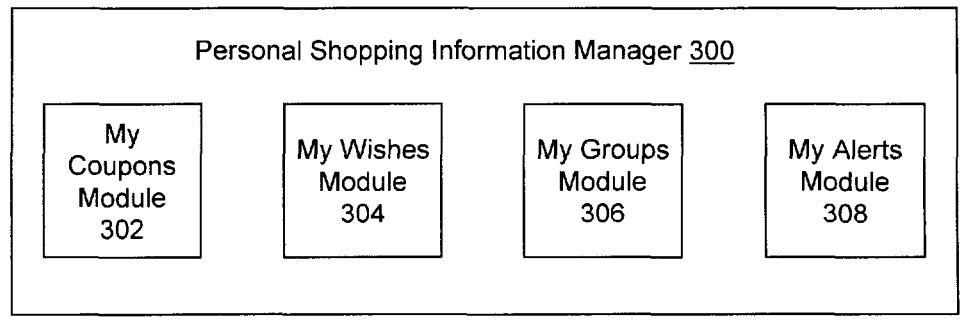
FIG. 3 is a block diagram representation of one embodiment of personal shopping information manager.

Referring to FIG. 3, a block diagram representation of one embodiment of personal shopping information manager 300 is shown. One embodiment of the personal shopping information manager 300 generally includes a My Coupons Module 302, a My Wishes Module 304, a My Groups Module 306, and a My Alerts Module 308. Alternative embodiments of the personal shopping information manager 300 may include a subset of the described modules or additional modules to facilitate the operation of the personal shopping information manager 300. In one embodiment, the personal shopping information manager 300 is hosted as a backend service that is accessible to the coupon services system 102.

In one embodiment, selected components of the personal shopping information manger can be installed in the customer device 106, by having the customer device 106 perform data synchronization with the backend personal shopping information manager 300. Examples of components of the personal shopping information manager 300 that can be installed on the customer device 106 include one or more of the My Coupons Module 302, the My Wishes Module 304 and the My Alerts Module 308. With the customer device 106, the customer can communicate with the coupon presentation system 104 for coupon offerings and customer shopping desires, at the times when the backend personal shopping information manager 300 is not accessible. In one embodiment, if one or more of the coupons that are stored on the customer device 106 approaches an expiration date or expires, the My Alerts Module 308 issues a coupon expiration notification to the customer via the customer device 106. In one embodiment, the coupon expiration notification alert is displayed on the customer device display screen. Examples of customer devices 106 include, but are not limited to, a personal computer, a mobile phone, a personal digital assistant, and a mobile computational device.

As mentioned previously, when a customer accesses the coupons services system 102 via a coupon presentation system 104, the customer has the option of digitally saving selected personalized coupons for possible future use. In one embodiment, the customer selects one or more personalized coupons, and has the selected one or more personalized coupons digitally saved to the backend Personal Shopping Information Manager 300. In one embodiment, the one or more selected personalized coupons are saved by the customer to the customer device 106 from the coupon presentation system 104. For example, the customer device 106 may be used to save personalized coupons when the customer does not have access to the personal shopping information manager 300 and thus the direct saving of the personalized coupons to the personal shopping information manager 300 is not possible.

In one embodiment, when a customer purchases a product from a point of sale system 108, the customer redeems a digitally saved personalized coupon associated with the purchased product by asking the point of sale system 108 to access the digitally saved coupon at the backend personal shopping information manager 300. In one embodiment, when a customer purchases one or more products at a point of sale system 108, the customer enables the point of sale system 108 to access the coupons stored in the backend personal shopping information manager 300. The point of sale system 108 sorts through the personalized coupons retrieved from the personal shopping information manager 300 and redeems those personalized coupons that apply to the products that the customer has selected for purchase. In one embodiment, when a customer purchases a product from a point of sale system 108, the customer redeems a digitally saved personalized coupon associated with the purchased product by directly transmitting the digitally saved coupon from the customer device 106 to the point of sale system 108. In one embodiment, when a customer purchases one or more products at a point of sale system 108, the customer enables the point of sale system 108 to access the coupons stored in the customer device 106. The point of sale system 108 sorts through the personalized coupons stored in the customer device 106 and retrieves and redeems those personalized coupons that apply to the products that the customer has selected for purchase.

The My Wishes Module 304 enables a customer to identify and save a description or listing of products that the customer may wish to purchase at a future date. In one embodiment, the listing of products saved by the customer in the My Wishes Module 304 are communicated to the coupons services system 102. In one embodiment, the coupon services system 102 issues personalized coupons associated with one or more of the products in the customer My Wishes Module 304. Issuing coupons based on the listing of products in a customer My Wishes Module 304 may provide that customer with an incentive to purchase the products associated with the newly issued personalized coupons. In one embodiment, the customer is provided with the option of subscribing for notification of upcoming promotional campaigns from the coupon services system 102. In one embodiment, upcoming promotional campaigns associated with the listing of products saved in the customer My Wishes Module 304 are forwarded to the email system that is accessible by the customer. In one embodiment, upcoming promotional campaigns associated with the listing of products saved in the customer My Wishes Module 304 are forwarded to the customer device 106.

The My Groups Module 306 allows first customer to add other customers, such as for examples friends and family to his list. This enables the first customer to specify other customers as a part of her/his shopping network group. In one embodiment, once such a shopping network group is in place, a first customer can designate other customers in the same shopping network group to access the coupons stored by the first customer in the My Coupons Module 302 for the purpose of sharing the coupons that the first customer has acquired. In one embodiment, the other designated customers are provided with access to the first customer My Wishes Module 304, for the purpose of sharing shopping desires.

In one embodiment, the My Alerts Module 308 enables a customer to request that the customer be notified when a coupon that has been selected for possible use by the customer is about to expire or has expired. In one embodiment, the My Alerts Module 308 enables a customer to receive notification when a personalized coupon that was originally issued to another customer has been transferred for use by the customer.

Figure 4:
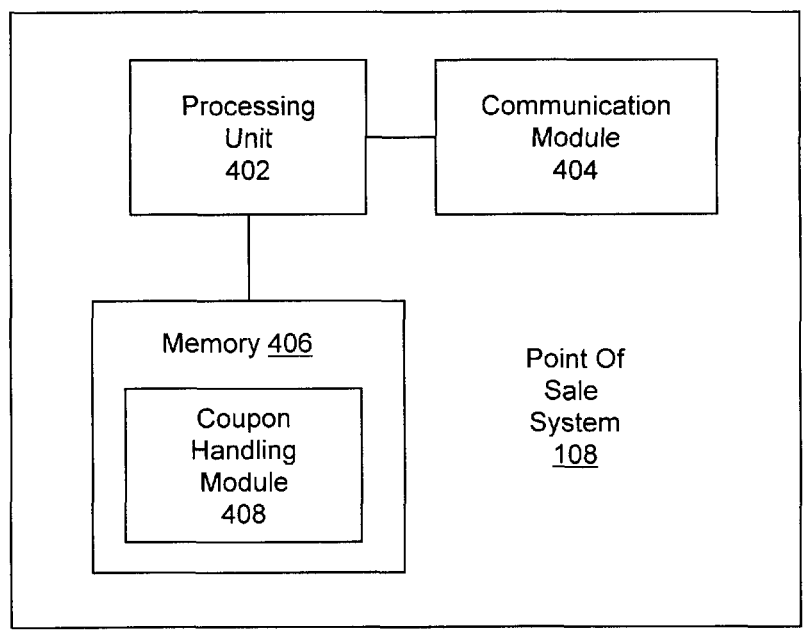
FIG. 4 is a block diagram representation of one embodiment of a point of sale system.

Referring to FIG. 4, a block diagram representation of one embodiment of a point of sale system 108 is shown. The customer selects one or more products for purchase at the point of sale system 108 and redeems the personalized coupon associated with the selected products at the point of sale system 108. The point of sale system 108 informs the coupon services system 102 when one or more of the personalized coupons that have been issued by the coupon services system 102 have been redeemed by a customer. In one embodiment, the point of sale system 108 is installed at a store. In one embodiment, the point of sale system 108 is an online retailer website.

The point of sale system 108 generally includes a processing unit 402 communicatively coupled to a communication module 404 and to a memory 406. A coupon handling module 408 is stored in the memory 406. Other modules that facilitate the operation of the point of sale system operations may also be stored in the memory 406.

The processing unit 402 generally includes a processor or controller. The communication module 404 generally coordinates the exchange of data between the point of sale system 108 and customer devices 106 and the exchange of data between the point of sale system 108 and the coupon services system 102. In one embodiment, the memory 406 includes one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices. The processing unit 402 generally retrieves and executes machine readable instructions or software programs that are stored in the memory 406.

The coupon handling module 408 coordinates the handling of personalized coupons that are presented by a customer to be redeemed at the point of sale system 108. In one embodiment, the communications module 404 is equipped to receive digitally transmitted coupons from a customer device 106. In one embodiment, the coupon handling module 404 receives one or more digitally saved coupons from a customer device 106 via a wireless communication channel such as for example including, but not limited to, a Wi-Fi communication channel and a Bluetooth communication channel between the point of sale system 108 and the customer device 106. In one embodiment, the communications module 404 is equipped to receive digitally transmitted coupons from the personal shopping information manager 300 over the Internet.

In one embodiment, upon receiving permission from the customer, the coupon handling module 408 accesses the digital coupons stored in the customer device 106. The coupon handling module 408 sorts through the personalized coupons stored in the customer device 106 and retrieves and redeems those personalized coupons that apply to the products that the customer has selected for purchase.

In one embodiment, the coupon handling module 408 is equipped to handle printed personalized coupons. In one embodiment, the coupon handling module 408 receives printed personalized coupons via a scanning device. In one embodiment, point of sale personnel manually input the printed personalized coupon via an input device, such as for example a keyboard and the manually input coupon is received by the coupon handling module 408.

The coupon handing module 408 performs a check to ensure that the personalized coupons that are presented by the customer are valid coupons prior to redeeming the presented coupons. In one embodiment, the coupon handling module 408 checks the expiration date of presented coupons to make sure they are valid. In one embodiment, the coupon handling module 408 contacts the coupon services system 102 and requests confirmation that the presented coupons have a coupon valid status.

The coupon handling module 408 also informs the coupon services system 102 when personalized coupons are redeemed at the point of sale system 108 by the customer. The coupon services system 102 updates the coupon state of redeemed coupons to redeemed coupon state, where the redeemed coupon state is a sub-category of the coupon invalid state. In one embodiment, the coupon services system 102 forwards the information associated with the redeemed personalized coupon that is received from the point of sale system 108 to the customer behavior analysis system 110. The customer behavior analysis system 110 updates the customer profile for the customer associated with the personalized coupon.

Figure 5:
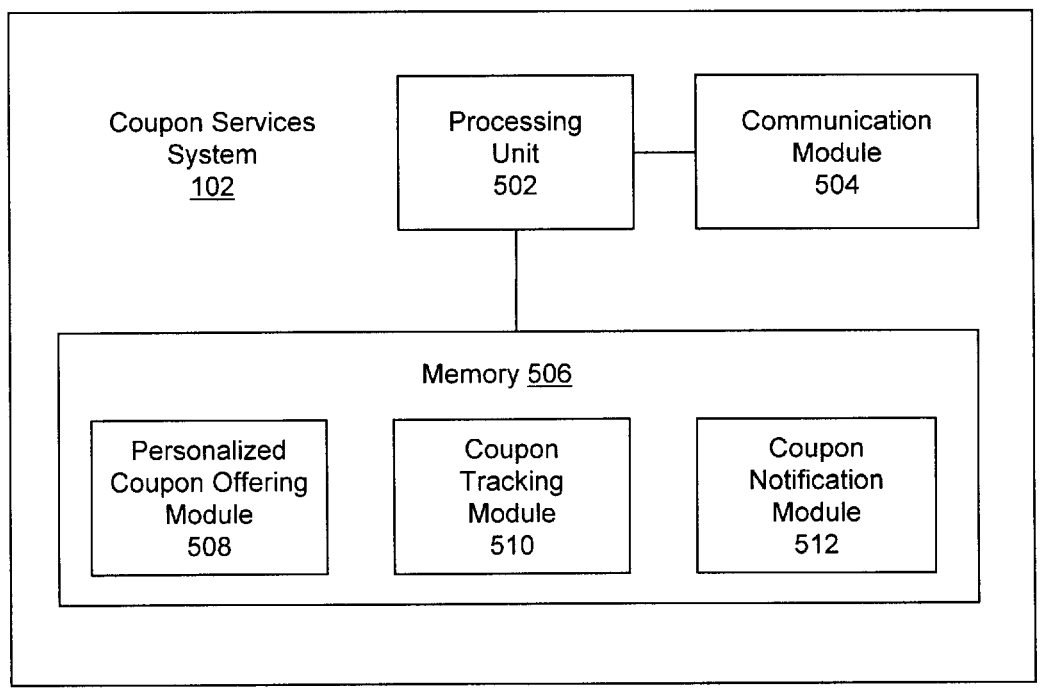
FIG. 5 is a block diagram representation of one embodiment of a coupon services system.

Referring to FIG. 5, a block diagram representation of one embodiment of a coupon services system 102 is shown. The coupon services system 102 generally includes a processing unit 502 communicatively coupled to a communication module 504 and a memory 506. The processing unit 502 generally includes a processor or controller. The communication module 504 coordinates communications between the coupon services system 102 and one or more of the coupon presentation system 104, the customer device 106, the point of sale system 108, the campaign manager 112, and the customer behavior analysis system 110.

A personalized coupon offering module 508, a coupon tracking module 510, and a coupon notification module 512 are stored in the memory 506. Other types of modules that facilitate the operation of the computer services system 102 may also be stored in the memory 506. In one embodiment, the memory 506 includes one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices. The processing unit 502 generally retrieves and executes machine readable instructions or software programs that are stored in the memory 506.

The personalized coupon offering module 508 issues personalized coupons for individual customers based on customer specific data. In one embodiment, the personalized coupon offering module 508 retrieves customer specific data associated with a customer from the customer behavior analysis system 110 and issues one or more personalized coupons for the customer based on the received customer specific data. In one embodiment, the personalized coupon offering module 508 receives campaign data from the campaign manager 112 and uses a combination of the customer specific data and the campaign data to issue personalized coupons for individual customers.

Figure 6:
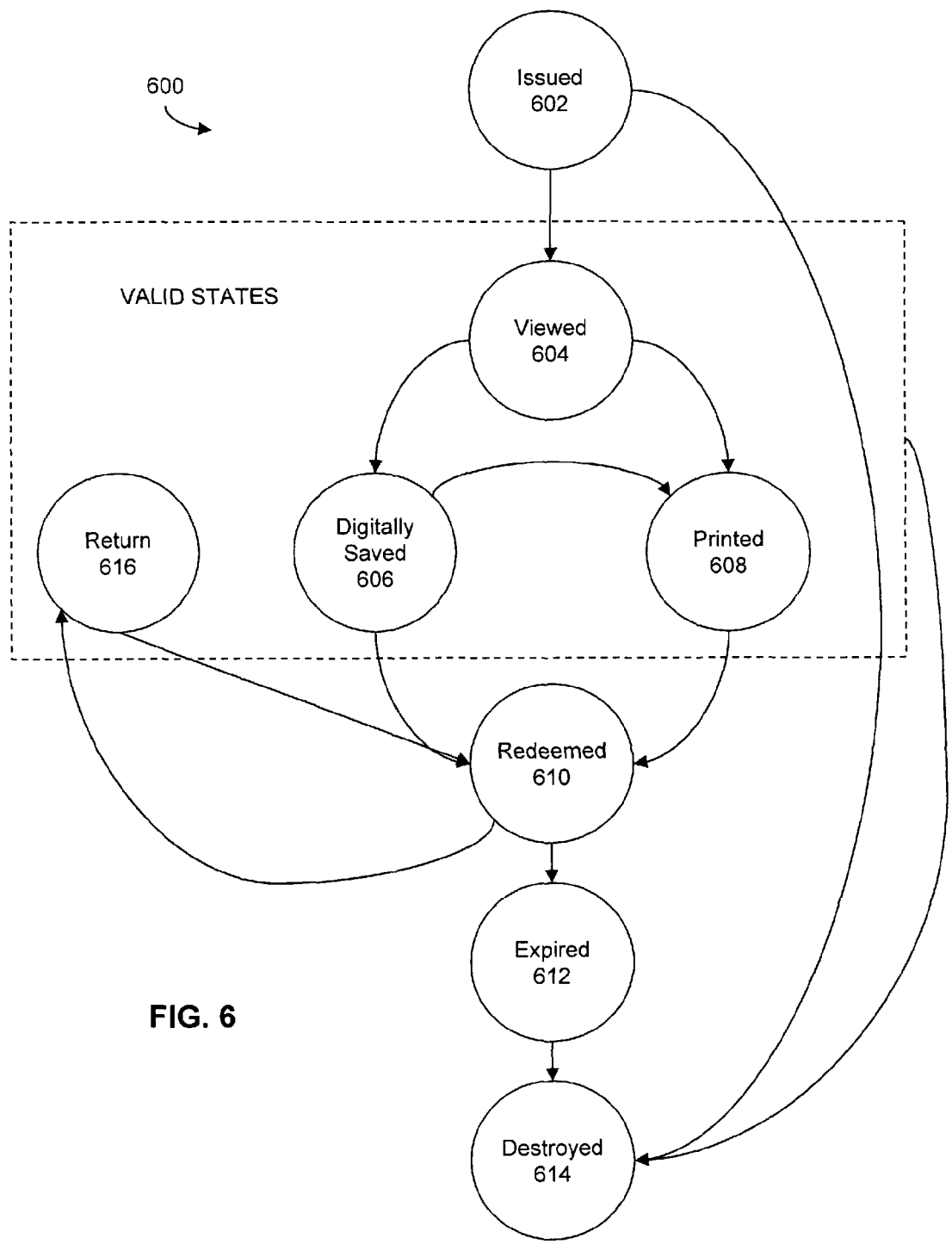
FIG. 6 is a state diagram representation of one embodiment of the different coupon states that the coupon tracking module assigns to a personalized coupon based on tracked customer responses.

The coupon tracking module 510 tracks and records customer responses to each of the personalized coupons issued by the personalized coupon offering module 508. More specifically, the coupon tracking module 510 tracks customer responses to each of the issued personalized coupons and assigns a coupon state to each of the personalized coupons based on tracked customer responses, where different coupon states are associated with different customer responses. Referring to FIG. 6, a state diagram representation of one embodiment of the different coupon states that the coupon tracking module 510 assigns to a personalized coupon based on tracked customer responses is shown. The operation of the coupon tracking module 510 is described below with reference to the state diagram.

The coupon tracking module 510 assigns a coupon invalid state to each personalized coupon upon issuance by the personalized coupon offering module 508. In one embodiment, the coupon tracking module 510 assigns a coupon issued state 602 to each personalized coupon upon issuance, where the coupon issued state is a sub-category of the coupon invalid state. In an alternative embodiment, the coupon tracking module 510 assigns a coupon valid state to each personalized coupon upon issuance by the personalized coupon offering module 508. In one embodiment, the coupon tracking module 510 assigns a coupon issued state to each personalized coupon upon issuance, where the coupon issued state is a sub-category of the coupon valid state.

The customer accesses the personalized coupons issued for that customer via a coupon presentation system 104. The coupon presentation system 104 includes a user interaction tracking module 218. The user interaction tracking module 218 monitors customer responses to the presentation of the issued personalized coupons during the customer coupon access session. The coupon presentation system 104 forwards the tracked customer responses to the coupon tracking module 510. More specifically, the coupon presentation system 104 tracks whether the customer has viewed one or more of the issued personalized coupons and whether the customer has either digitally saved and/or printed one or more of the viewed personalized coupons for possible future use. The coupon tracking module 510 receives the tracked customer responses from the coupon presentation system 104 and assigns an appropriate coupon state to each of the personalized coupons based on the received tracked customer responses.

In one embodiment, the coupon tracking module 510 assigns a coupon valid state to each of the issued personalized coupon that has been viewed by the customer. In one embodiment, the coupon tracking module 510 assigns a coupon viewed state 604 to each personalized coupon that has been viewed by the customer, where the coupon viewed state 604 is a sub-category of the coupon valid state.

In one embodiment, the coupon tracking module 510 maintains the assignment of the valid coupon state for each of the personalized coupons that have been selected by the customer from the viewed personalized coupons for possible future use. In one embodiment, the coupon tracking module 510 assigns a coupon digitally saved state 606 to each of the viewed personalized coupons that have been digitally saved by the customer, where the coupon digitally saved state 606 is a sub-category of the coupon valid state. The coupon tracking module 510 assigns a coupon printed state 608 to each of the viewed personalized coupons that have been printed by the customer, where the coupon printed state 608 is a sub-category of the coupon valid state.

In an alternative embodiment, the coupon tracking module 510 assigns a coupon selected state to each of the viewed personalized coupons that have been selected by the customer for possible future use, where the coupon selected state is a sub-category of the coupon valid state. The coupon tracking module 510 identifies the printing or digital saving of a viewed personalized coupon as the selection of the personalized coupon for possible future use.

In one embodiment, the coupon tracking module 510 identifies those issued personalized coupons that were not viewed by the customer at the customer presentation system 104. In one embodiment, the identified personalized coupons are assigned a coupon invalid state. In one embodiment, the identified coupons are assigned a coupon destroy state 614, where the coupon destroy state is a sub-category of the coupon invalid state. When the coupon tracking module 510 assigns a coupon destroy state 614 to an issued personalized coupon, that personalized coupon is destroyed and no longer available for selection by the customer. The unique coupon identifiers associated with each of the destroyed coupons are available for reuse with newly issued personalized coupons.

The coupon tracking module 510 tracks whether the customer redeems one or more of the selected the personalized coupons at a point of sale system 108. The coupon handling module 408 at the point of sale system 108 informs the coupon services system 102 when one or more personalized coupons have been redeemed at the point of sale system 108 by a customer. The coupon tracking module 510 receives the tracked customer responses from the point of sale system 108 and assigns an appropriate coupon state to each of the personalized coupons based on the received tracked customer responses. In one embodiment, the coupon tracking module 510 assigns a coupon invalid state to each of the personalized coupons that have been redeemed by the customer. In one embodiment, the coupon tracking module 510 assigns a coupon redeemed state 610 to each of the personalized coupons that have been redeemed by the customer, where the coupon redeemed state 610 is a sub-category of a coupon invalid state. Redeemed personalized coupons are not available for reuse by the customer.

The coupon tracking module 510 tracks whether a product that was purchased using a personalized coupon issued by coupon services system 102 has been returned to a point of sale system 108. In one embodiment, the coupon tracking module 510 assigns a coupon valid state to the personalized coupon associated with the returned product so that the personalized coupon is available for reuse by the customer. In one embodiment, the coupon tracking module 510 assigns a coupon return state 616 to the personalized coupon associated with the returned product, where the coupon return state 616 is a sub-category of the coupon valid state.

The coupon tracking module 510 also tracks whether a product purchased using a personalized coupon is being exchanged for another product at a point of sale system 108. The coupon tracking module 510 assigns a coupon valid state to the previously redeemed personalized coupon associated with the product brought in for the exchange. In one embodiment, the coupon tracking module 510 assigns a coupon return state 616 to the previously redeemed personalized coupon associated with the product brought in for the exchange, where the coupon return state 616 is a sub-category of a coupon valid state. The personalized coupon associated with the product that was brought in to be exchanged is available for reuse by the customer.

The coupon tracking module 510 tracks the expiration of the personalized coupons issued by the personalized coupon offering module 508. In one embodiment, each of the personalized coupons is valid for a pre-defined period of time. The coupon tracking module 510 assigns a coupon invalid state to a personalized coupon upon expiration. In one embodiment, the coupon tracking module 510 assigns a coupon expired state 612 to each of the expired personalized coupons, where the coupon expired state 612 is a sub-category of the coupon invalid state.

The coupon tracking module 510 assigns a coupon destroy state 614 to each of the expired personalized coupons, where the coupon destroy state 614 is a sub-category of the coupon invalid state. When the coupon tracking module 510 assigns a coupon destroy state 614 to an issued personalized coupon, that personalized coupon is destroyed and no longer available for selection by the customer. The unique coupon identifiers associated with each of the destroyed coupons are available for reuse with newly issued personalized coupons.

In one embodiment, the coupon notification module 512 communicates coupon notification data to customers. In one embodiment, the coupon notification data is provided to the customer via a customer email account. In one embodiment, the coupon notification data consists of coupon promotion notification informing a customer when promotion specific coupons are being issued by the personalized coupon offering module 508 for the customer to promote selected products. The customer can access the promotion specific coupons via a coupon presentation system 104.

In one embodiment, the coupon notification data consists of coupon expiration notification. As mentioned previously, the coupon tracking module 510 assigns a coupon expired state 612 to those coupons that have expired. The coupon notification module 512 identifies the customers that have selected personalized coupons that have expired or are about to expire and sends the identified customers coupon expiration notification detailing the specific personalized coupons that the customer has selected that have expired or are about to expire.

Figure 7:
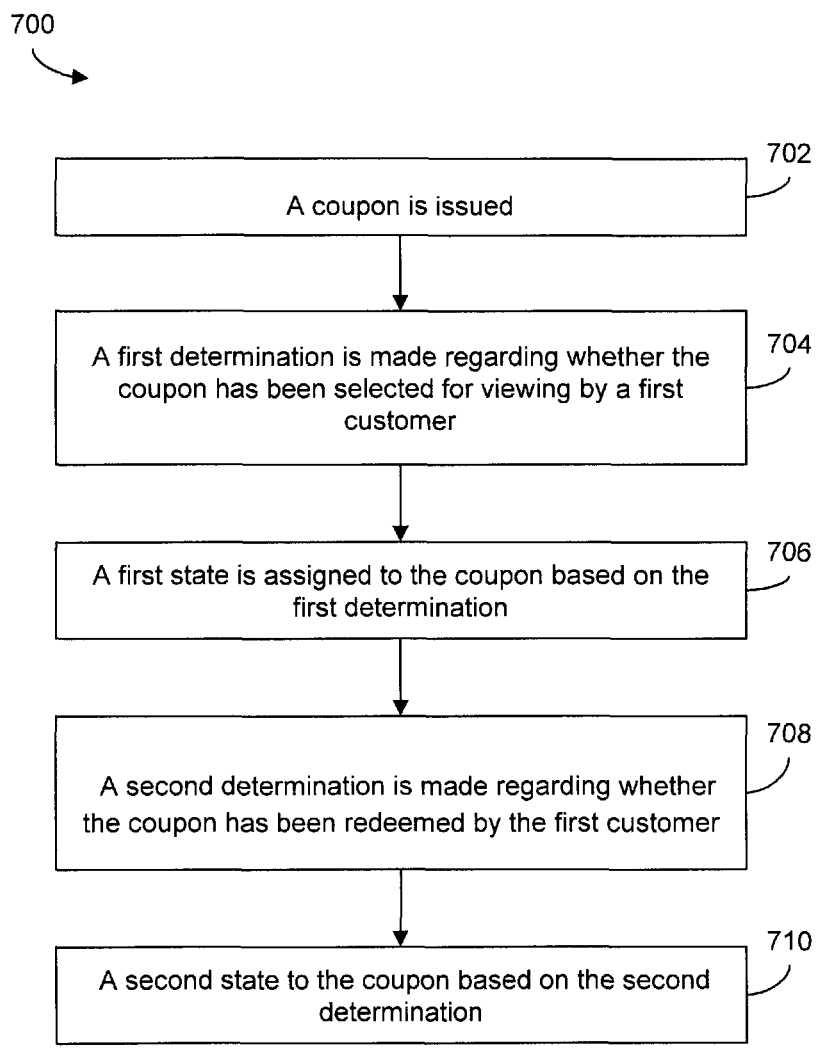
FIG. 7 is a flowchart representation of one embodiment of a method of tracking customer response to a coupon.

In one embodiment, the coupon notification data consists of customer coupon selection data. In many cases, retailers or manufacturers authorize the issuance of a limited number of personalized coupons for special promotions and would like feedback regarding the number of issued personalized coupons that have been selected for possible use by customers. In some instances, the retailers or manufacturers may want to know the aggregated consumer response behavior on the collection of the customers that are responding to specific promotional coupon offerings. The coupon notification module 512 sends requested types of customer coupon selection data to such retailers or manufacturers Referring to FIG. 7, a flow chart representation of one embodiment of a method 700 of tracking customer response to a coupon is shown. A coupon is issued at step 702. A first determination is made regarding whether the coupon has been selected for viewing by a first customer at step 704. A first state is assigned to the coupon based on the first determination at step 706. A second determination is made regarding whether the coupon has been redeemed by the first customer at step 708. A second state is assigned to the coupon based on the second determination at step 710. While the steps in the method 700 have been described in a particular order, the steps may be performed in a different order or additional steps may be performed in addition to the described steps.

In one embodiment, a computer readable medium stores a computer executable program for tracking customer response to a coupon. The computer readable medium includes computer readable code for issuing a coupon, computer readable code for making a first determination regarding whether the coupon has been selected for viewing by a first customer, computer readable code for assigning a first state to the coupon based on the first determination, computer readable code for making a second determination regarding whether the coupon has been redeemed by the first customer, and computer readable code for assigning a second state to the coupon based on the second determination.

It should be noted that while systems implemented using software or firmware executed by hardware have been described above, those having ordinary skill in the art will readily recognize that the disclosed systems could be implemented exclusively in hardware through the use of one or more custom circuits, such as for example, application-specific integrated circuits (ASICs) or any other suitable combination of hardware and/or software.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A method comprising:
outputting, by a processor, personalized coupons based on a customer profile of a customer;
receiving, by the processor through an input device, responses provided by the customer to the personalized coupons being displayed;
tracking, by the processor, the responses to determine which of the personalized coupons are viewed, which of the personalized coupons are saved to an electronic device of the customer, and which of the personalized coupons are printed;
assigning, by the processor, states to each of the personalized coupons comprising, for each of the personalized coupons:
assigning a viewed state to the personalized coupon when it is viewed by the customer,
assigning a printed state to the personalized coupon when it is printed by the customer,
assigning a saved state to the personalized coupon when it is saved by the customer, and
assigning an initial valid state to the personalized coupon that is assigned at least one of the viewed state, the printed state, and the saved state;
updating, by the processor, the customer profile based on the responses provided by the customer to generate an updated customer profile; and
generating, by the processor, additional personalized coupons based on the updated customer profile.

2. The method of claim 1 further comprising:
tracking which of the personalized coupons that are saved and printed are redeemed to purchase products; and
returning, in real time to the processor, information that identifies the personalized coupons that are saved and printed to purchase the products.

3. The method of claim 1 further comprising:
tracking which of the personalized coupons are redeemed to purchase a product and then the product is returned.

4. The method of claim 1, wherein the customer profile includes a history of the responses provided by the customer to the personalized coupons being displayed to the customer.

5. The method of claim 1, wherein the additional personalized coupons are generated during an access session while the personalized coupons are displayed to the customer.

6. The method of claim 1 further comprising:
transmitting one of the personalized coupons from the electronic device of the customer to a point of sale system to redeem the one of the personalized coupons when the customer purchases a product.

7. The method of claim 6 further comprising:
updating the customer profile based on use of the one of the personalized coupons to make a purchase;
generating additional personalized coupons based on the updated customer profile.

8. The method of claim 6 further comprising:
forming a group of customers;
receiving, from the customer, a designation of other customers to add to the group of customers;
providing the group of customers, including the other customers, with access to the personalized coupons of the customer.

9. The method of claim 1, further comprising:
determining whether the personalized coupon assigned the initial valid state is redeemed or expired;
in response to determining that the personalized coupon is redeemed or expired, changing the initial valid state to an invalid state;

in response to determining that the personalized coupon is not redeemed and not expired, maintaining the initial valid state; and receiving a request from a point of sale to validate at least one of the personalized coupons and responding to the request based on a state assigned to the at least one of the personalized coupons, wherein the at least one of the personalized coupons is validated if the initial valid state is maintained and invalidated if it is assigned the invalid.

10. A computer system, comprising:
a memory that stores instructions; and
a processor that executes the instructions to:
  display personalized coupons based on a customer profile of a customer;
  receive, from the customer, responses to the personalized coupons being displayed;
  track, at the computer system, the responses to determine which of the personalized coupons are viewed, and which of the personalized coupons are printed, in which tracking the responses comprises:
    assigning states to the personalized coupons comprising, for each of the personalized coupons:
      assigning a viewed state to the personalized coupon when it is viewed by the customer,
      assigning a printed state to the personalized coupon when it is printed by the customer, and
      assign an initial valid state to the personalized coupon when it is assigned the viewed state or the printed state;
  update the customer profile based on the responses received from the customer to generate an updated customer profile; and
  generate additional personalized coupons based on the updated customer profile, wherein the additional personalized coupons are generated during an access session.

11. The computer system of claim 10, wherein the additional personalized coupons are generated on a real time basis as the customer provides the responses to the personalized coupons being displayed.

12. The computer system of claim 10, wherein the processor further executes the instructions to track which of the personalized coupons are redeemed to purchase a product and then the product is returned.

13. The computer system of claim 10 further comprising:
a point of sale system in communication with the electronic device of the customer, wherein one of the personalized coupons is transmitted from the electronic device to the point of sale system to redeem the one of the personalized coupons when the customer purchases a product.

14. The computer system of claim 10 wherein the processor further executes the instructions to:
  determine whether the personalized coupon assigned the initial valid state is redeemed or expired;
  in response to determining that the personalized coupon is redeemed or expired, change the initial valid state to an invalid state;
  in response to determining that the personalized coupon is not redeemed and not expired, maintain the initial valid state; and
  receive a request from a point of sale to validate at least one of the personalized coupons and respond to the request based on a state assigned to the at least one of the personalized coupons, wherein the at least one of the personalized coupons is validated if the initial valid state is maintained and invalidated if it is assigned the invalid state.

15. A computer system, comprising:
a memory that stores instructions; and
a processor that executes the instructions to:
  output personalized coupons to a customer based on a customer profile of that customer;
  receive, from the customer, responses to the personalized coupons;
  assign a state to each of the personalized coupons based on the customer responses to the coupons, comprising, for each of the personalized coupons:
    assigning a viewed state to the personalized coupon when that coupon is viewed by the customer after being issued,
    assigning a printed state to the personalized coupon when that coupon is printed by the customer,
    assigning a saved state to the personalized coupon when that coupon is saved by the customer, and
    assigning an initial valid state to the personalized coupon that is assigned at least one of the viewed state, the printed state, and the saved state;
  receive a request from a point of sale to validate at least one of the personalized coupons and respond to the request based on a state assigned to the at least one of the personalized coupons.

16. The computer system of claim 15, wherein the processor further executes the instructions to:
  update the customer profile based on states assigned to the personalized coupons issued to the corresponding customer to generate an updated customer profile; and
  generate additional personalized coupons for the customer based on the updated customer profile.

17. The computer system of claim 15, wherein:
  the processor further executes the instructions to assign a destroyed state to the personalized coupon when that personalized coupon is issued but not subsequently viewed by the customer; and
  the processor further executes the instructions to return an invalid status to any subsequent request from the point of sale regarding personalized coupons assigned the destroyed state.

18. The computer system of claim 15, wherein the processor further executes the instructions to issue an alert to the customer based on an expiration date for the personalized coupon when that personalized coupon is assigned the printed state or the saved state.

19. The computer system of claim 15, wherein:
  the processor further executes the instructions to receive customer input indicating a product the customer is interested in potentially purchasing; and
  the processor further executes the instructions to update the customer profile with the input indicating a product the customer is interested in potentially purchasing.

20. The computer system of claim 15, wherein the processor further executes the instructions to receive customer input designating at least one other customer who is allowed to access the personalized coupons with a stored state that have been stored by the customer.

21. The computer system of claim 20, wherein the processor further executes the instructions to provide the at least one other customer with access to a portion of the customer profile for the customer that indicates a product the customer is interested in potentially purchasing.

22. The computer system of claim 20, wherein the processor further executes the instructions to notify the at least one other customer that the customer has shared the personalized coupons with that at least one other customer.

23. The computer system of claim 15, wherein the processor further executes the instructions to:
- determine whether the personalized coupon assigned the initial valid state is redeemed or expired;
- in response to determining that the personalized coupon is redeemed or expired, change the initial valid state to an invalid state;
- in response to determining that the personalized coupon is not redeemed and not expired, maintain the initial valid state,
- wherein the at least one of the personalized coupons is validated at the point of sale if the initial valid state is maintained and invalidated if it is assigned the invalid state.

24. The computer system of claim 23, wherein:
- the processor further executes the instructions to assign a returned state to the personalized coupon when that personalized coupon has been redeemed and, subsequently, a product purchased with that personalized coupon is returned to a corresponding point of sale; and
- the processor further executes the instructions to return a valid status to any subsequent request from the point of sale regarding personalized coupons assigned the returned state.

* * * * *